E. G. Shortt.
Shaft Coupling.
No. 95,277. Patented Sep. 28, 1869.

Witnesses:
Jno. E. Brooks
Frank J. Horley

Inventor.
E. G. Shortt
Per
Attorneys.

United States Patent Office.

EDWARD G. SHORTT, OF CARTHAGE, NEW YORK.

Letters Patent No. 95,277, dated September 28, 1869.

IMPROVED SHAFT-COUPLING

The Schedule referred to in these Letters Patent and making part of the same.

*To all whom it may concern:*

Be it known that I, EDWARD G. SHORTT, of Carthage, in the county of Jefferson, and State of New York, have invented a new and improved Shaft-Coupling; and I do hereby declare that the following is a full, clear, and exact description thereof, which will enable others skilled in the art to make and use the same, reference being had to the accompanying drawings, forming part of this specification.

The object of this invention is to provide an improved mode of coupling shafts together, and comprises a pair of curved wedges, a sleeve, a pair of set-screws, and radial pins in the shafts, which are used by placing the wedges, which have semicircular grooves, for fitting the shafts on the two sections to be joined together, and placing the sleeve over them, to which they are fitted, and then screwing the set-screws through the sides of the sleeve, into conical recesses in the said wedges, to clamp them tightly between the shafts and the interior wall of the sleeve, all as hereinafter more fully specified.

Figure 1:
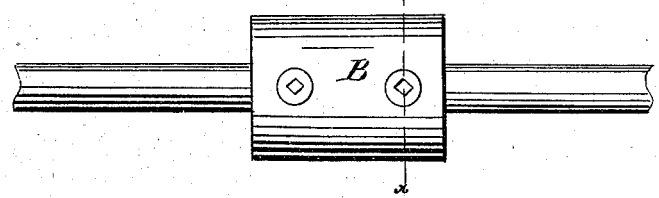
Figure 1 represents a side elevation of my improved coupling, joining two sections of a shaft.
Figure 2:
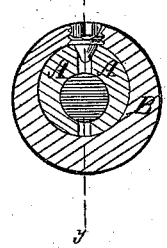
Figure 2 represents a transverse section of the same, taken on the line $x\ x$ of fig. 1.
Figure 3:
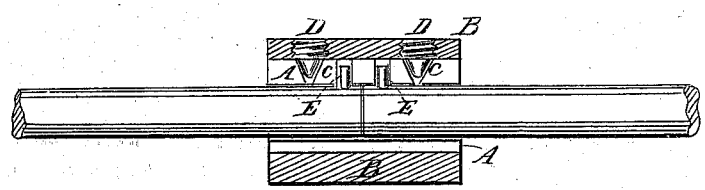
Figure 3 represents a longitudinal section of the same, taken on the line $y\ y$ of fig. 1.

A represents a pair of curved wedges, made by boring a longitudinal hole through a cylindrical block eccentrically to the centre, and then splitting the said block on a radial line drawn through the centres of the thickest and thinnest sides. The said bore is intended to be the same size as the shafts to be coupled.

B represents a sleeve, having a longitudinal hole of the same diameter as the said wedges. It is also bored eccentrically, for adjustment with the eccentric wedges, so that the said sleeve may be centred with the shaft.

These wedges have conical cavities C at the heads, for the reception of the conical set-screws D, which are screwed in through radial holes in the sleeve, for wedging them apart, and thereby clamping them tightly between the shafts and the sleeves B.

The said shafts have pins E rising up between the wedges, for operation, in conjunction with the friction thus imparted to the said shafts, as a further means of preventing them from turning.

The whole constitutes a simple and efficient coupling, calculated to hold the shafts rigidly and truly together.

Having thus described my invention,

I claim as new, and desire to secure by Letters Patent—

The combination, with the shafts provided with the pins E, of the eccentrically-bored wedges A and set-screws D, substantially as specified.

EDWARD G. SHORTT.

Witnesses:
 ZELOTUS WOOD,
 CHRISTIAN OBERLY.